May 13, 1952     L. HOFFMAN     2,596,403
FISHING ROD HOLDER
Filed June 14, 1950
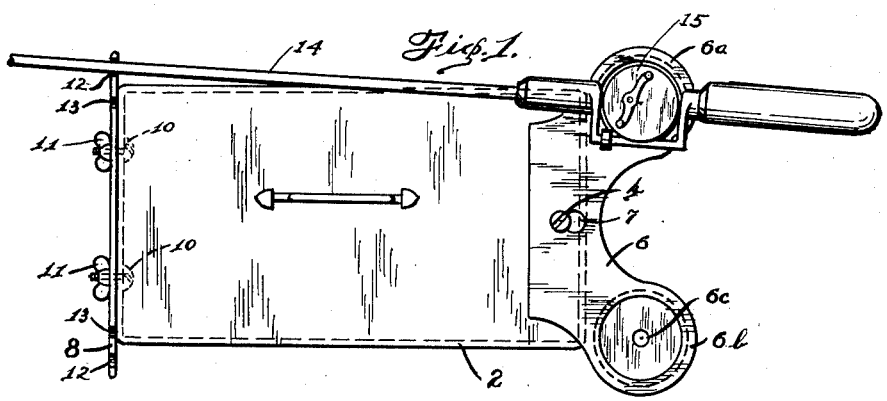
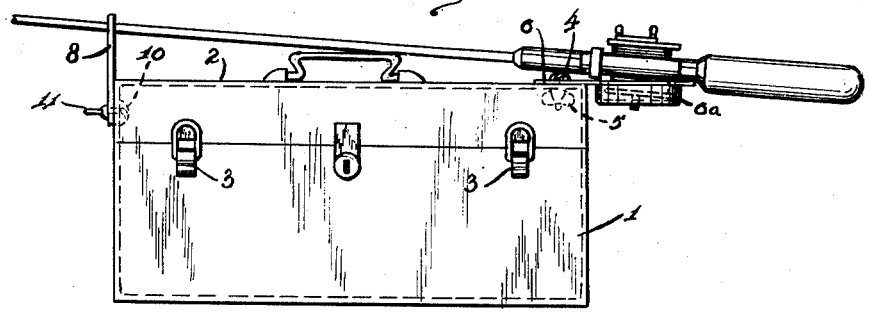
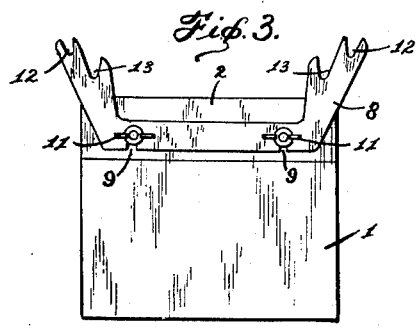
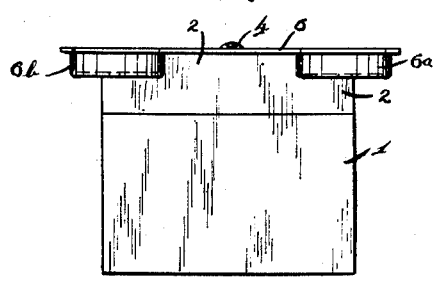
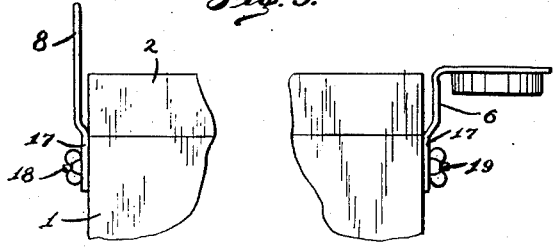
INVENTOR.
LESTER HOFFMAN
BY
William J. Ruano
ATTORNEY Patented May 13, 1952

2,596,403

UNITED STATES PATENT OFFICE 2,596,403

FISHING ROD HOLDER

Lester Hoffman, Birdsboro, Pa.

Application June 14, 1950, Serial No. 168,043

4 Claims. (Cl. 43—21.2)

This invention relates broadly to a fishing-rod holder, and, more particularly, to accessories for attachment to a fishing tackle box to permit the lid or other portion of the box to serve as a part of the holding means for supporting one or a pair of fishing rods.

In fishing it is oftentimes desirable to provide a fixed support for the fishing rod or for a pair of fishing rods. A common expedient is to drive a support means into the ground. An outstanding objection to such support means is that when fishing on very soft ground or on rocks, such means is not feasible therefore making it necessary for the fisherman to spend considerable time in building a suitable support. Furthermore, in shore fishing, with changing tides, it is desirable from time to time to shift the rod and its supporting means either toward or away from the ocean or lake making it necessary to rebuild the supporting structure with each move.

An object of the present invention is to provide a fishing-rod holder which is devoid of the above named disadvantages and which is readily portable to permit easy shifting of the support whenever desired.

A more specific object of the invention is to provide accessories for attachment to a fishing tackle box which accessories serve as supports for a pair of fishing rods in a manner so as to support the rods in an inclined position.

Other objects and advantages will become apparent from a study of the following specification taken in conjuction with the accompanying drawing wherein:

Figure 1 is a top plan view of a fishing tackle box showing accessories attached to the lid thereof, serving as fishing-rod holders and embodying the principles of the present invention;

Figure 2 is a front elevational view of the fishing-tackle box and accessories shown in Figure 1;

Figure 3 is an end elevational view more clearly showing the supporting accessory attached to the left end of the box as viewed in Figures 1 and 2.

Figure 4 is an end elevational view showing the accessory attached to the right end of the box as viewed in Figures 1 and 2, and Figure 5 is fragmentary front elevational view showing a modified form of support.

Referring more particularly to Figures 1 to 4, numeral 1 denotes a tackle box having a lid 2 pivotally mounted thereto and which may be locked closed by latching elements 3. A bolt 4 is inserted through a hole in the top panel of the lid and the wing nut 5 is screw-threadedly secured to said bolt underneath the lid so as to serve as a detachable fastener means for the accessory or support plate 6. The support plate 6 has a centrally disposed hole 7 larger than the bolt head and an adjoining slot of only slightly greater diameter than the bolt shank so that the plate may be readily slipped into place by inserting the bolt head through hole 7, then sliding the plate outwardly and holding it securely by tightening of wing nut 5.

The accessory or holder 6 is provided with a pair of extensions 6a and 6b having pressed out depressions of cup shape very similar to those in a baking pan for biscuits. Aperture 6c is provided at the center of the bottom of the cup shaped depression so as to accommodate the axially extending projection of a conventional fishing reel. The support accessory 6 is preferably made of aluminum or other suitable noncorroding, light material.

At the opposite edge portion of the lid there is detachably secured a second accessory or support plate 8 of substantially U-shape having cut out portions or slots 9 at the lower edge thereof. Slots 9 are adapted to fit about the shanks of bolts 10. Support plate 8 is securely fastened to the box lid by wing nuts 11 which may be screwed from the outside of the box. Support plate 8 is likewise preferably made of aluminum or other suitable light material. At the extremities of the substantially U-shape support plate 8 there are provided notches 12 for supporting the intermediate portions of the fishing rods. There are also provided forks or extensions 13 for providing a lower pair of notches so as to receive the rods in cases where less inclination of the rods is desired, thereby providing a selective amount of tilt to the rods.

In operation, it will be seen, therefore, that after the support plates 6 and 8 are screwed into place, a pair of fishing rods 14 (only one of which is shown) may be supported on these support plates. The reel 15 of the rod is supported within one of the cup shaped portions, or extensions, such as 6a and the axially extending projection thereof will extend through hole 6c. Thus the fishing rods are securely supported in an inclined position and may be adjustably tilted by shifting the intermediate portion of the rods to either notches 12 or to the notches formed by extensions 13, as desired. It will be noted that the greatest dimensions of support plates 6 and 8 are less than the greatest dimensions of the box thereby allowing the support plates to be packed and carried within the box, either laid on the bottom or standing on edge along the sides of the box.

Figure 5 shows a modification of the assessory support plates and their mode of support wherein the plates, instead of being secured to the lid, are detachably secured to the top portion of the box. They are provided with vertical extensions 17 which are attached by means of bolts 18 and 19 to side portions of the box and laterally offset in a manner so as to support the support plates outwardly of opposite edges of the lid of the box to enable opening of the lid while the support plates are secured in place. The support plate 8 is attached in a similar manner. Extensions 6a and 6b project beyond the front and rear surfaces of the box to allow opening of the lid.

Thus it will be seen that I have provided an efficient holder for conveniently supporting one or a pair of fishing rods on a fishing tackle box, which holder comprises a pair of supported elements or attachments which are detachably secured to the box easily and quickly and which are so constructed as to securely support the fishing rods in an adjustably tilted position.

While I have illustrated and described several modifications of my invention, it will be understood that there are by way of illustration only, and that various changes and modifications may be made within the comtemplation of my invention and within the scope of the following claims.

I claim:

1. A fishing-rod holder for attachment to a base member comprising the lid of a fishing tackle box, comprising a sheet metal extension having a cup-like depression therein adapted to extend beyond said base member and including a perforated top plate, detachable fastening means for securing said holder to a portion of said base member in a manner so as to support the extension so that the cup-like depression is immediately beyond one end of said lid, a second holder adapted to extend vertically at the opposite end of said lid and having a notched top portion for receiving an intermediate portion of the fishing rod, and detachable fastening means for supporting said second holder at said opposite end of the lid whereby a fishing rod reel on said fishing rod may be inserted in the cup-like depression and held in a tilted position by said rod received in said notched top portion.

2. A fishing rod holder for supporting a pair of fishing rods in an inclined position on the lid of a fishing tackle box, comprising a holder element which includes a plate portion with a perforation, a detachable fastening means extending through said perforation to secure the plate portion to the top of said lid and a pair of extensions on said plate portion, each of which includes a cup-shaped container, for receiving a pair of reels of a pair of fishing rods, said holder element being secured to one end of said lid, a second holder element of substantially U-shape having forked extremities, said second holder including slots along the bottom portion thereof, and detachable fastening means extendable through said last named slots for attaching said second holder to the opposite edge portion of said lid.

3. A fishing rod holder as recited in claim 2 wherein apertures are provided centrally of the bottoms of the cup-shaped containers and wherein forked portions are provided on the legs of said U-shaped holder so as to permit adjustable tilt to fishing rods supported thereon.

4. A fishing rod holder adapted to be detachably mounted on opposite vertical walls of a base member, comprising a sheet metal plate having a pair of integral cup-like depressions adapted to be disposed immediately beyond one of said walls, each for supporting a fishing rod reel, detachable fastening means for securing said plate to one end of said base member, a second sheet metal plate of substantially U-shape, and detachable fastening means for securing the base of said U-shaped metal plate to the opposite vertical wall of said base member so that the legs of the U will extend vertically upwardly from said last mentioned wall, each of said legs having a plurality of notches disposed at different heights for supporting an intermediate portion of the fishing rod at selective heights in order to obtain selective tilt of the fishing rod.

LESTER HOFFMAN.

REFERENCES CITED

The following references are of record in the file of this patent:

UNITED STATES PATENTS

| Number | Name | Date |
|---|---|---|
| 2,314,747 | White | Mar. 23, 1943 |
| 2,529,148 | Fratt | Nov. 7, 1950 |